(12) United States Patent
Moore et al.

(10) Patent No.: US 7,672,192 B2
(45) Date of Patent: Mar. 2, 2010

(54) METHOD FOR COMPUTING AND USING TIMING ERRORS THAT OCCUR IN MULTIPLES PREDICTED BY MULTIPLE PREDICTION ALGORITHM

(75) Inventors: Ian Moore, Trigg (AU); Clement Kostov, Great Wilbraham (GB); Robert Ian Bloor, Pearland, TX (US); William H. Dragoset, Jr., Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 238 days.

(21) Appl. No.: 10/554,776

(22) PCT Filed: Dec. 10, 2003

(86) PCT No.: PCT/US03/39310

§ 371 (c)(1),
(2), (4) Date: Oct. 28, 2005

(87) PCT Pub. No.: WO2004/099819

PCT Pub. Date: Nov. 18, 2004

(65) Prior Publication Data

US 2007/0032954 A1 Feb. 8, 2007

Related U.S. Application Data

(60) Provisional application No. 60/467,376, filed on May 2, 2003.

(51) Int. Cl.
*G01V 1/38* (2006.01)
(52) U.S. Cl. .......................................... 367/24
(58) Field of Classification Search ................. 367/15, 367/21, 24, 20
See application file for complete search history.

(56) References Cited

U.S. PATENT DOCUMENTS

| | | | | |
|---|---|---|---|---|
| 4,887,243 A | * | 12/1989 | Pann | 367/24 |
| 4,935,903 A | * | 6/1990 | Sanders et al. | 367/24 |
| 4,992,993 A | | 2/1991 | Chambers | |
| 5,051,960 A | * | 9/1991 | Levin | 367/24 |
| 5,521,881 A | | 5/1996 | Lau et al. | |
| 5,532,976 A | * | 7/1996 | Schneider, Jr. | 367/38 |
| 5,640,368 A | | 6/1997 | Krebs | |
| 5,986,973 A | * | 11/1999 | Jericevic et al. | 367/24 |
| 6,094,620 A | | 7/2000 | Gasparotto et al. | |
| 6,169,959 B1 | | 1/2001 | Dragoset, Jr. | |

(Continued)

OTHER PUBLICATIONS

Levin, Stewart. "AVO estimation using surface related multiple prediction." Stanford Exploration Project, Report 82, May 11, 2001.*

(Continued)

*Primary Examiner*—Scott A Hughes
(74) *Attorney, Agent, or Firm*—WesternGeco L.L.C.

(57) ABSTRACT

Method for computing one or more timing errors that occur in one or more multiples predicted by a multiple prediction algorithm. The method includes the steps of generating one or more actual three-dimensional primary travel times and one or more actual three-dimensional multiple travel times, applying the multiple prediction algorithm to the actual three-dimensional primary travel times to generate one or more travel times for the multiples predicted by the multiple prediction algorithm, and subtracting the actual three-dimensional multiple travel times from the travel times for the multiples predicted by the multiple prediction algorithm.

30 Claims, 5 Drawing Sheets

U.S. PATENT DOCUMENTS

| | | |
|---|---|---|
| 6,507,787 B1 | 1/2003 | Da Silva et al. |
| 6,625,543 B1 * | 9/2003 | Bevc et al. .................. 702/14 |
| 6,799,118 B2 * | 9/2004 | MacKay .................. 702/16 |

OTHER PUBLICATIONS

Dragoset and Jericevic, "Some remarks on surface multiple attenuation," *Geophys.*, 63(2):772-789, 1998.

Dragoset, "Geophysical applications of adaptive-noise cancellation," *SEG Technical Program Expanded Abstracts*, 14:1389-1392, 2005.

Ross, Yu and Gasparotto, "Traveltime prediction and suppression of 3-D multiples," *Geophys.*, 64(1):261-277, 1999.

van Dedem and Verschuur, "3D surface-related multiple prediction, an inversion approach," *SEG Technical Program Expanded Abstracts*, 2005.

van Dedem and Verschuur, "3D surface-related multiple prediction, a sparse inversion approach," Delphi Imaging and Characterization Project, vol. XIII, Ann. Report, Ch. 6, pp. 95-134, 2002.

Kostov et al.; "2-D SRME Performance in the Presence of Streamer Feathering and Structural Dip"; EAGE 65th Conference and Exhibition; Stavanger, Norway; Jun. 2-5, 2003.

Dragoset et al.; "The Impact of Field-Survey Characteristics on Surface-Related Multiple Attenuation"; Geophysical Prospecting; vol. 54, No. 6, pp. 781-791; Nov. 2006.

* cited by examiner

METHOD FOR COMPUTING AND USING TIMING ERRORS THAT OCCUR IN MULTIPLES PREDICTED BY MULTIPLE PREDICTION ALGORITHM

CROSS-REFERENCE TO RELATED APPLICATIONS

This application claims benefit of U.S. provisional patent application Ser. No. 60/467,376, filed May 2, 2003, which is herein incorporated by reference.

BACKGROUND OF THE INVENTION

1. Field of the Invention

Embodiments of the present invention generally relate to marine seismic surveying and, more particularly, to a method for eliminating surface related multiples from a record of seismic data.

2. Description of the Related Art

Seismic surveying is a method for determining the structure of subterranean formations in the earth. Seismic surveying typically utilizes seismic energy sources, which generate seismic waves, and seismic receivers, which detect seismic waves. The seismic waves propagate into the formations in the earth, where a portion of the waves reflects from interfaces between subterranean formations. The amplitude and polarity of the reflected waves are determined by the differences in acoustic impedance between the rock layers comprising the subterranean formations. The acoustic impedance of a rock layer is the product of the acoustic propagation velocity within the layer and the density of the layer. The seismic receivers detect the reflected seismic waves and convert the reflected waves into representative electrical signals. The signals are typically transmitted by electrical, optical, radio or other means to devices that record the signals. Through analysis of the recorded signals (or traces), the shape, position and composition of the subterranean formations can be determined.

Marine seismic surveying is a method for determining the structure of subterranean formations underlying bodies of water. Marine seismic surveying typically utilizes seismic energy sources and seismic receivers located in the water, which are either towed behind a vessel or positioned on the water bottom from a vessel. The energy source is typically an explosive device or compressed air system that generates seismic energy, which then propagates as seismic waves through the body of water and into the earth formations below the bottom of the water. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Additionally, motion sensors, such as geophones or accelerometers may be used. Both the sources and receivers may be strategically repositioned to cover the survey area.

Seismic waves, however, reflect from interfaces other than just those between subterranean formations, as would be desired. Seismic waves also reflect from the water bottom and the water surface, and the resulting reflected waves themselves continue to reflect. Waves that reflect multiple times are referred to as multiple reflections or "multiples". Surface multiples are those waves that have reflected multiple times between the water surface and any upward reflectors, such as the water bottom or formation interfaces, before being sensed by a receiver. Generally, surface multiples are considered undesirable noises that interfere with and complicate the desired signal. Considerable effort is expended in the design of seismic data acquisition and the processing of seismic data to limit the impact of multiple reflections on the final processed seismic profiles. Even so, in many areas, the quality of seismic data is lowered, sometimes substantially, by the presence of multiple reflections.

Various prior art methods have been tried for removal or elimination of surface multiples from recorded traces. If the subsurface reflectors are flat or have dips in one direction, then a one-dimensional data acquisition geometry may provide sufficient information for the surface multiples to be predicted using a two-dimensional multiple prediction algorithm. However, if the subsurface reflectors have dips in more than one direction or the data acquisition geometry is not one-dimensional (e.g., due to ocean currents), then surface multiples may only be accurately predicted by a three-dimensional multiple prediction algorithm, which is generally more costly than a two-dimensional multiple prediction algorithm.

Accordingly, a need exists in the art for a method for determining when it would be necessary to perform a two-dimensional multiple prediction algorithm versus a three-dimensional multiple prediction algorithm to avoid unnecessary costly expenditure.

SUMMARY OF THE INVENTION

Embodiments of the present invention are generally directed to a method for computing one or more timing errors that occur in one or more multiples predicted by a multiple prediction algorithm. The method includes the steps of generating one or more actual three-dimensional primary travel times and one or more actual three-dimensional multiple travel times, applying the multiple prediction algorithm to the actual three-dimensional primary travel times to generate one or more travel times for the multiples predicted by the multiple prediction algorithm, and subtracting the actual three-dimensional multiple travel times from the travel times for the multiples predicted by the multiple prediction algorithm.

In one embodiment, the actual three-dimensional travel times are computed by applying a ray tracing method to a three-dimensional earth model.

In another embodiment, the actual three-dimensional travel times are computed by applying a ray tracing method to a three-dimensional earth model and one or more data acquisition geometry parameters.

Embodiments of the present invention are also directed to a method for optimizing a marine survey design. The method includes the steps of generating a cross line aperture, comparing the cross line aperture with a previous cross line aperture, and modifying one or more data acquisition geometry based on a result of the comparison between the cross line aperture with the previous cross line aperture.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
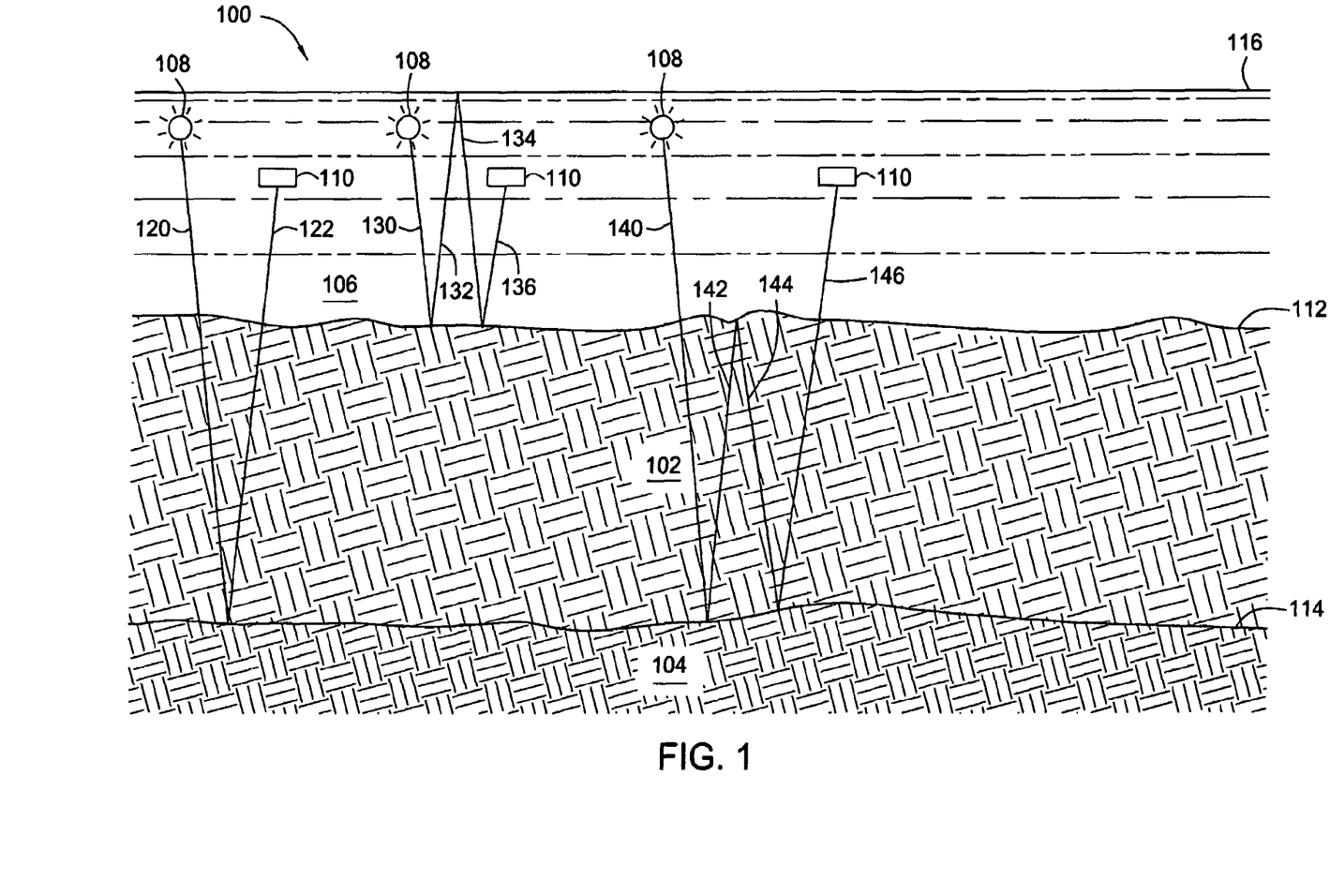
FIG. 1 illustrates a schematic view of marine seismic surveying.

FIG. 1 illustrates a schematic view of marine seismic surveying 100. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formation, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interface 114, and the downward reflector at the water surface 116 above, as described more fully below. Each time the reflected waves propagate past the position of a seismic receiver 110, the receiver 110 senses the reflected waves and generates representative signals.

Primary reflections are those seismic waves that have reflected only once, from the water bottom 112 or an interface between subterranean formations, before being detected by a seismic receiver 110. An example of a primary reflection is shown in FIG. 1 by raypaths 120 and 122. Primary reflections contain the desired information about the subterranean formations, which is the goal of marine seismic surveying. Surface multiples are those waves that have reflected multiple times between the water surface 116 and any upward reflectors, such as the water bottom 112 or formation interfaces, before being sensed by a receiver 110. An example of a surface multiple which is specifically a water bottom multiple is shown by raypaths 130, 132, 134 and 136. An example of an interbed multiple is shown by raypaths 140, 142, 144 and 146. Interbed multiples generally have lesser downward reflection coefficients than surface multiples, and hence, have lower amplitudes. As previously mentioned, all such multiples are extraneous noise that obscures the desired primary reflection signal.

Figure 2:
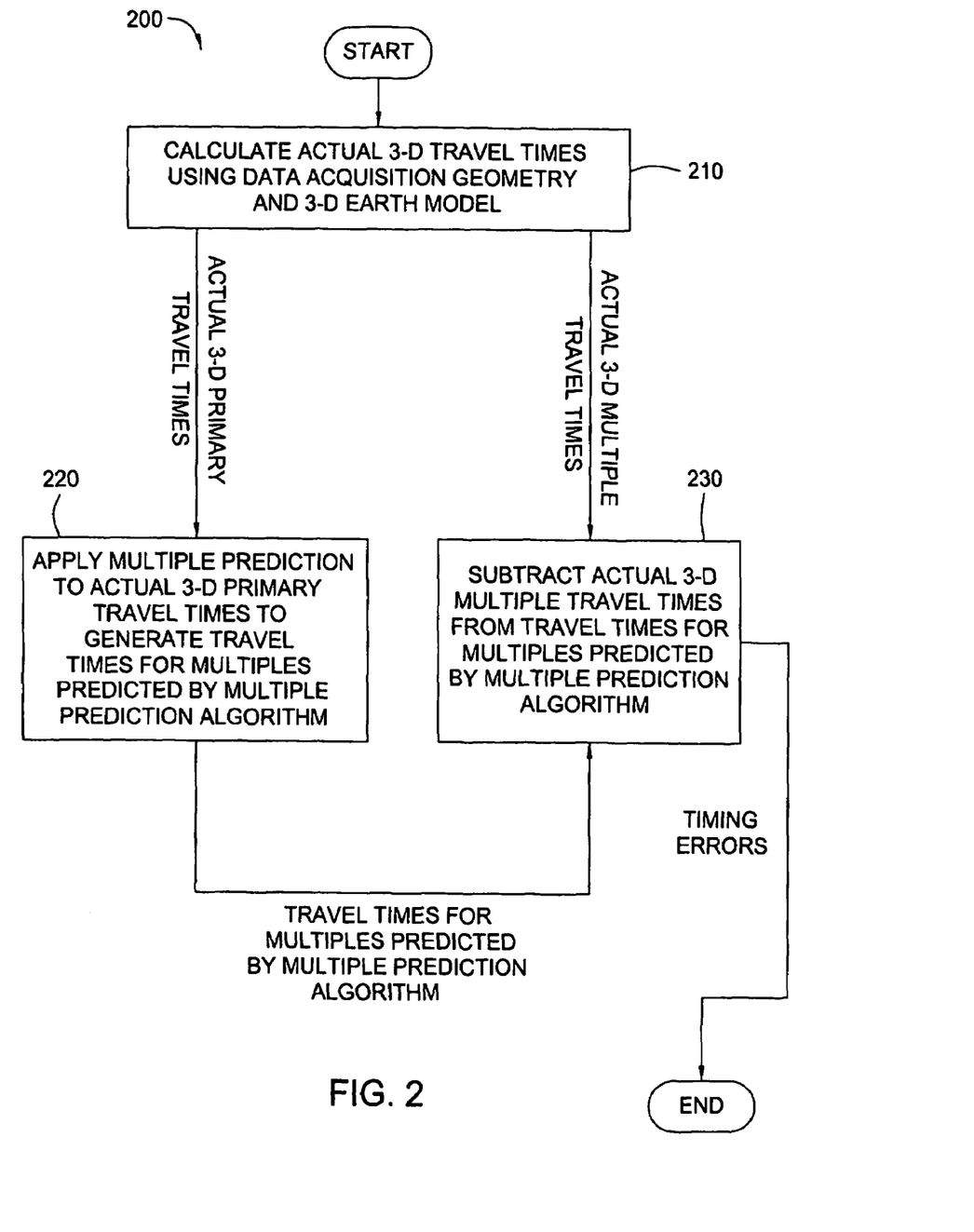
FIG. 2 illustrates a flow diagram of a method for computing timing errors that occur in multiple reflections predicted by a multiple prediction algorithm in accordance with one embodiment of the invention.

FIG. 2 illustrates a flow diagram of a method 200 for computing timing errors that occur in multiple reflections predicted by a multiple prediction algorithm in accordance with one embodiment of the invention. In one embodiment, the multiple prediction algorithm is a two-dimensional prediction algorithm. However, the multiple prediction algorithm may be a one-dimensional prediction algorithm, a three-dimensional prediction algorithm, or any other multiple prediction algorithm with features that provide different levels of cost effectiveness and different kinds of seismic data sets. Method 200 may be used to compute timing errors in various predicted multiple reflections, including predicted surface multiple reflections and predicted interbed multiple reflections. Generally, timing errors are created when multiple reflections are predicted by a two-dimensional algorithm that ignores the inherent three-dimensional nature of seismic data. At step 210, the actual three-dimensional travel times for the primary reflections (actual primary travel times) and actual three-dimensional travel times for multiple reflections (actual multiple travel times) are computed. Higher order multiple reflections may be viewed as having component segments, which may themselves be multiple reflections. For example, a second-order surface multiple reflection may be viewed as having two components: a primary reflection and a first-order multiple reflection. Accordingly, for the sake of notational simplicity, the terms "primary reflection," "primary," and other variants generally refer to the component segments of a multiple reflection regardless of its order.

The complexity of this step depends on the subsurface geology and the degree of realism desired. In one embodiment, the above-referenced computation in step 210 is performed by applying a ray tracing method to a three-dimensional earth model, which may take into account cross-line dip information, planar reflective and diffractive surface information. In another embodiment, the above-referenced computation is performed by applying the ray tracing method to the three-dimensional earth model and data acquisition geometry parameters, which may include cable-feathering information and source and receiver coordinates information. In yet another embodiment, the three-dimensional earth model is a simple dipping plane water bottom model, which may be used to compute actual three-dimensional travel times for only the water bottom primary and multiple reflections.

Processing then continues to step 220 at which a multiple prediction algorithm is applied to the actual three-dimensional primary travel times to generate travel times for multiple reflections predicted by the multiple prediction algorithm. In one embodiment, the multiple prediction algorithm used in step 220 is a two-dimensional multiple prediction algorithm. However, the multiple prediction algorithm in step 220 may be a one-dimensional prediction algorithm, a three-dimensional prediction algorithm, or any other multiple prediction algorithm with features that provide different levels of cost effectiveness and different kinds of seismic data sets. Such predicted multiple reflections typically contain timing errors. The multiple prediction algorithm used in step 220 may be a surface related multiple reflections elimination (SRME) algorithm, if the multiple reflections are surface multiple reflections. An example of a two-dimensional prediction algorithm used in step 220 is described with reference to FIG. 3 below.

Figure 3:
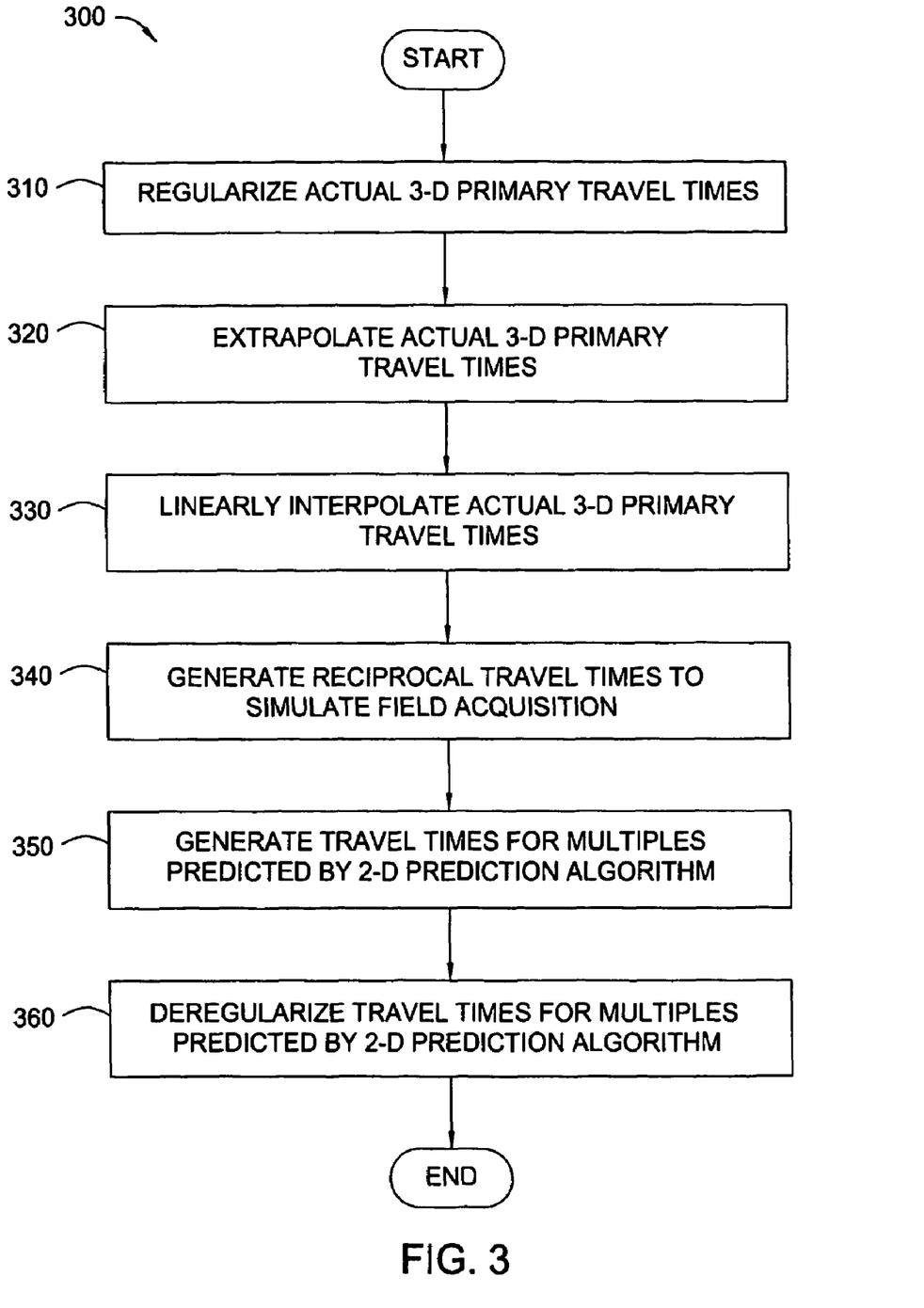
FIG. 3 illustrates a flow diagram of a two-dimensional prediction algorithm for generating travel times for multiple reflections predicted by the two-dimensional prediction algorithm in accordance with one embodiment of the invention.

FIG. 3 illustrates a flow diagram of a two-dimensional prediction algorithm 300 in accordance with one embodiment of the invention. Notably, the two-dimensional prediction algorithm 300 includes all the processing steps that would be necessary if the two-dimensional prediction algorithm 300 were applied to actual seismic traces, as opposed to travel times. Steps 310, 320, 330, 340 and 360 are optional, depending on the detailed nature of the travel times being processed. Step 350, on the other hand, is a required process. Further, if step 310 is not performed, then step 360 also should not be performed.

Referring now to step 310, the two-dimensional prediction algorithm 300 may include the step of regularizing the actual three-dimensional primary travel times. This step is configured to change the actual three-dimensional travel times, which are based on actual field data coordinates (i.e., three-dimensional), to travel times based on nominal coordinates (i.e., two-dimensional), which generally do not take into account cross-line dip information. Step 310 is generally performed using a differential normal moveout algorithm.

Referring now to step 320, the two-dimensional prediction algorithm 300 may also include the step of extrapolating the actual three-dimensional primary travel times to fill in the travel times associated with missing data traces in the field data. Generally, missing data traces are caused by having a minimum source-to-receiver offset in the field that is equal to at least several receiver intervals. Possible extrapolating procedures include parabolic fitting and others known to persons with ordinary skill in the art.

Referring now to step 330, the two-dimensional prediction algorithm 300 may further include interpolating the actual three-dimensional primary travel times. In one embodiment, the actual three-dimensional primary travel times may be linearly interpolated in common offset planes. Generally, step 330 is only necessary if the source and receiver intervals are unequal.

Referring now to step 340, the two-dimensional prediction algorithm 300 may further include generating a set of reciprocal travel times for the actual three-dimensional primary travel times to simulate field acquisition with a partial or full split spread. Step 340 is configured to allow the two-dimensional prediction algorithm 300 to avoid producing diffraction artifacts from the zero-offset edge typically associated with marine field data.

Referring now to step 350, the actual three-dimensional primary travel times, which may have been modified by steps 310, 320, 330 and 340, are used to calculate travel times for multiple reflections predicted by a two-dimensional prediction algorithm. In one embodiment, the travel times for the multiple reflections predicted by the two-dimensional predicted algorithm are calculated using the method(s) described in U.S. Pat. No. 6,169,959, issued to Dragoset et al., which is incorporated herein by reference. At step 360, the travel times for the multiple reflections predicted by the two-dimensional predicted algorithm are deregularized, i.e., the travel times are mapped back from nominal coordinates (i.e., two-dimensional) to the actual field data coordinates (i.e., three-dimensional).

Referring back to FIG. 2, at step 230, the actual three-dimensional multiple travel times generated at step 210 are now subtracted from the travel times for the multiple reflections predicted by the multiple predicted algorithm to produce travel time errors or timing errors that occur in the multiple reflections predicted by the multiple predicted algorithm. The amount or size of the timing errors may be used to indicate the type of multiple prediction algorithm (i.e., two-dimensional versus three-dimensional) to be used to remove the multiple reflections.

Typically, multiple reflections predicted by a two-dimensional multiple prediction algorithm are adaptively subtracted from a recorded seismic data set to produce a multiple-free seismic data set. As such, if the aforementioned timing errors are larger than the desirable matching filter lengths (which are typically in units of time), then the adaptive subtraction algorithm using the two-dimensional prediction algorithm will not be able to compensate for the timing errors, and thereby fail. In this manner, method 200 may be configured to indicate as to when it would be necessary to perform a three-dimensional prediction algorithm versus a two-dimensional prediction algorithm to remove the multiple reflections from the recorded seismic data set.

Figure 4:
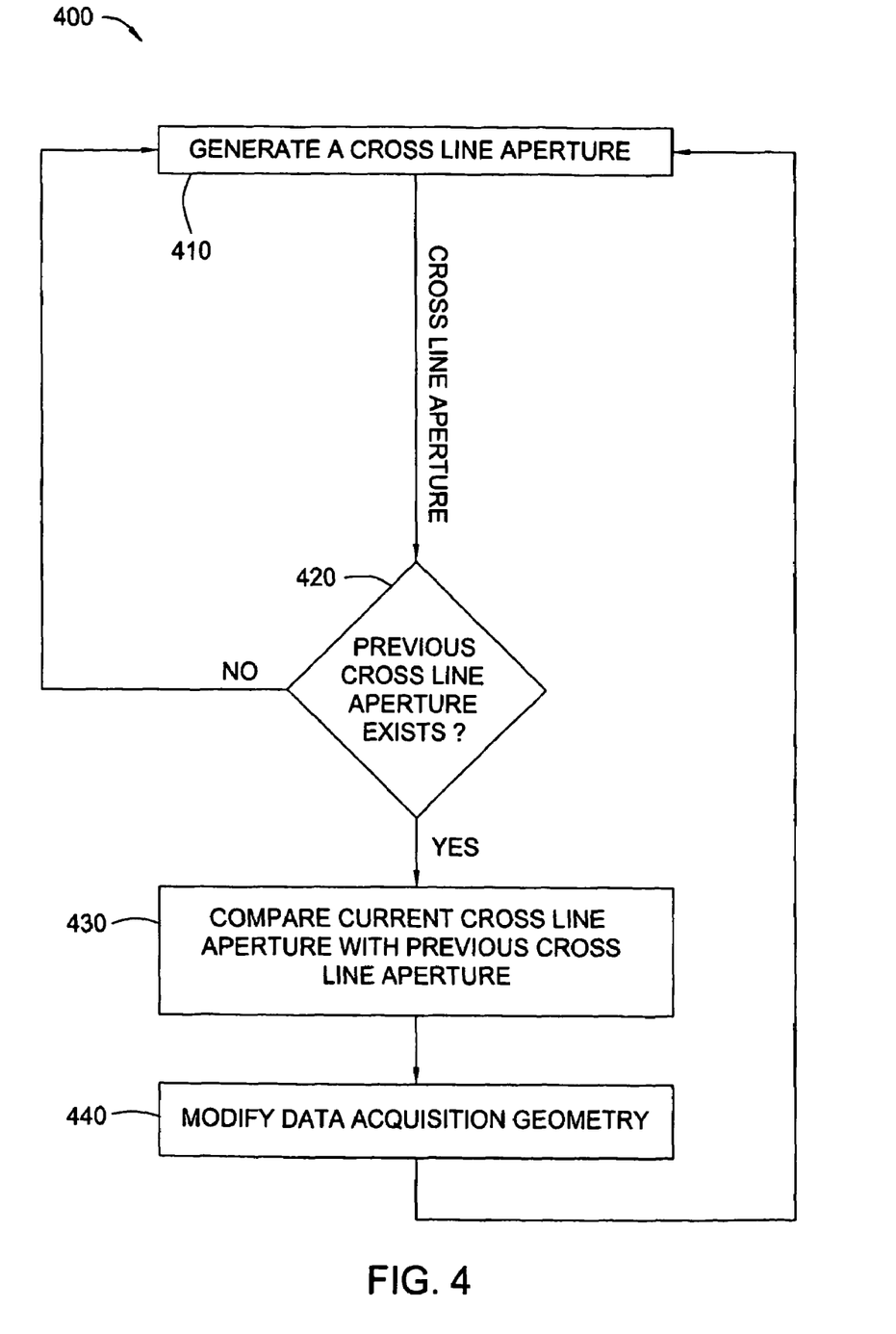
FIG. 4 illustrates a method for optimizing a marine survey design in accordance with one embodiment of the invention.

In accordance with one embodiment of the invention, computation of the timing errors may also be used to optimize a marine survey design. FIG. 4 illustrates a method 400 for optimizing a marine survey design in accordance with one embodiment of the invention. At step 410, a cross line aperture is calculated. The cross line aperture is generally defined by two-dimensional coordinates of surface reflection points that are associated with the multiple reflections. In one embodiment, the cross line aperture is calculated by applying a ray tracing method to a three-dimensional earth model, as described in the previous paragraphs. In another embodiment, the cross line aperture is calculated by applying a ray tracing method to a three-dimensional earth model and data acquisition geometry, such as cable feathering information. At step 420, a determination is made as to whether a previous cross line aperture exists. If the answer is in the negative, then processing returns to step 410. If the answer is in the affirmative, then a comparison is made between the current cross line aperture and the previous cross line aperture (step 430). At step 440, the data acquisition geometry is modified to optimize the cross line aperture according to the result of the comparison. In one embodiment, the data acquisition geometry is modified to minimize the cross line aperture. In another embodiment, modifying the data acquisition geometry includes modifying the cable-feathering using steerable streamers. In yet another embodiment, modifying the data acquisition geometry includes modifying the receiver cross line spread width to encompass the cross line aperture. The optimization method 400 may be performed during a line change.

In accordance with another embodiment, the timing errors computed using the methods described above may be used to improve an adaptive subtraction algorithm. For example, the timing errors may be used to constrain or adjust the matching filters used in the adaptive subtraction algorithm. In another example, the timing errors may be used to adjust multiples produced by a multiple prediction algorithm, such as a two-dimensional multiple prediction algorithm, in which the adjustment includes applying a static time shift to each trace. In such an example, the multiples produced by the multiple prediction algorithm are split into segments, and each timing error-based adjustment is applied to each segment. In one embodiment, a suite of adjustments based on the timing errors may be applied to the multiples produced by multiple prediction algorithm to create a suite of possible multiple models, and a multidimensional adaptive subtraction algorithm is then used to optimally filter and subtract the suite of possible multiple models from a recorded seismic data set.

Figure 5:
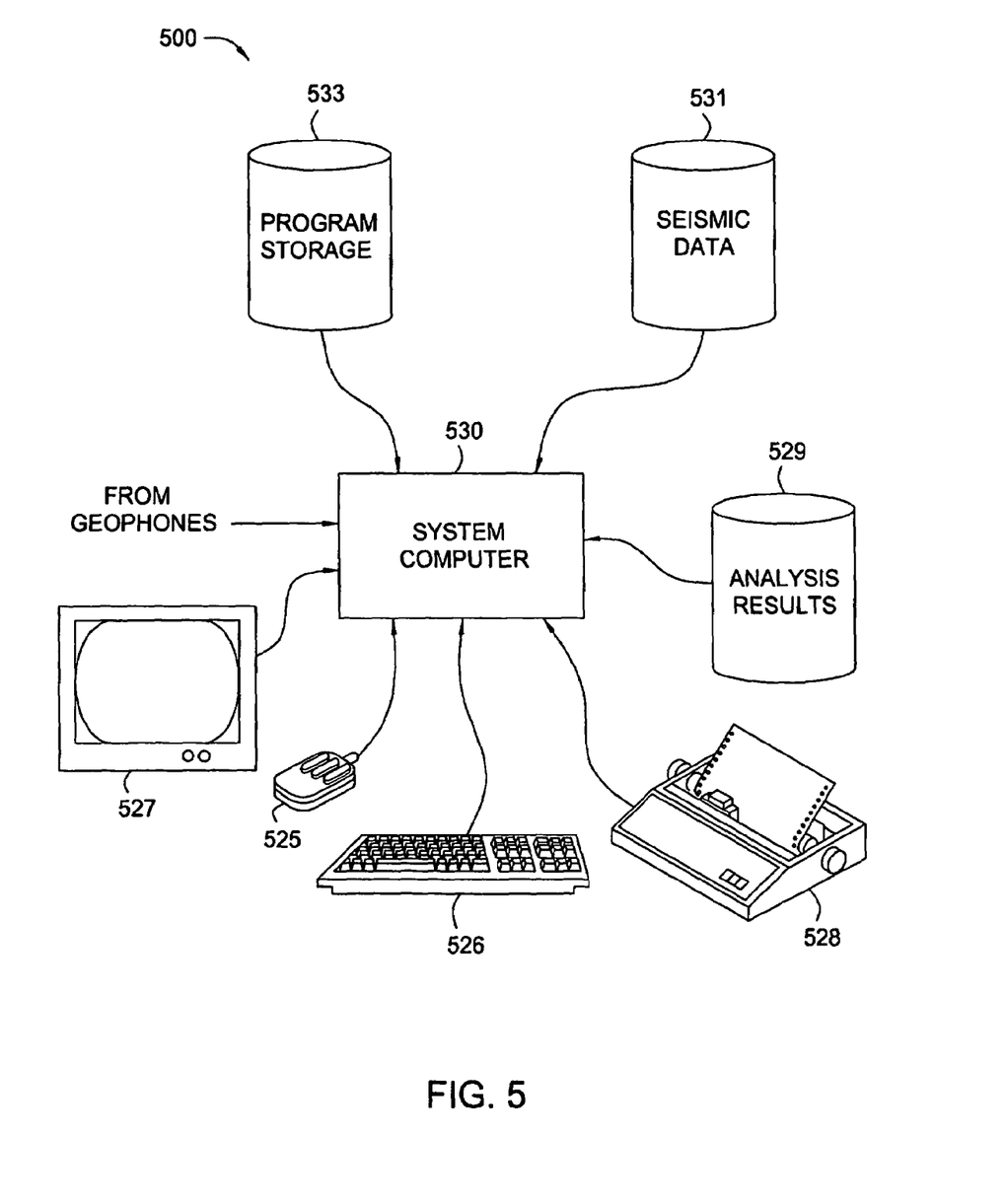
FIG. 5 illustrates a computer network into which embodiments of the invention may be implemented.

FIG. 5 illustrates a computer network 500, into which embodiments of the invention may be implemented. The computer network 500 includes a system computer 530, which may be implemented as any conventional personal computer or workstation, such as a UNIX-based workstation. The system computer 530 is in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one embodiment, seismic data from geophones and positional information are stored in disk storage device 531. The system computer 530 may retrieve the appropriate data from the disk storage device 531 to perform the timing errors computation according to program instructions that correspond to the methods described herein. The program instructions may be written in a computer programming language, such as C++, Java and the like. The program instructions may be stored in a computer-readable memory, such as program disk storage device 533. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 530 presents output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 is in communication with geophones (either directly or via a recording unit, not shown), to receive signals indicative of the reflected seismic energy. These signals, after conventional formatting and other initial processing, are stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for computing one or more timing errors that occur in one or more multiple reflections predicted by a multiple prediction algorithm, comprising:
   (a) generating one or more actual three-dimensional primary travel times and one or more actual three-dimensional multiple travel times from an actual seismic survey having cable feathering information;
   (b) applying a first multiple prediction algorithm to the actual three-dimensional primary travel times to generate one or more travel times for the multiple reflections predicted by the first multiple prediction algorithm;
   (c) subtracting the actual three-dimensional multiple travel times from the travel times for the multiple reflections predicted by the first multiple prediction algorithm, thereby generating one or more timing errors that occur in the multiple reflections predicted by the first multiple prediction algorithm;
   (d) determining whether the first multiple prediction algorithm is sufficient to remove the one or more multiple reflections from the seismic data based on one or more sizes of the timing errors; and
   (e) wherein step (b), (c) or (d) is performed by program instructions accessed by a computer system.

2. The method of claim 1, wherein the multiple prediction algorithm is one of a one-dimensional multiple prediction algorithm, a two-dimensional multiple prediction algorithm and a three-dimensional multiple prediction algorithm.

3. The method of claim 1, wherein generating the actual three-dimensional travel times comprises applying a ray tracing method to a three-dimensional earth model.

4. The method of claim 3, wherein the three-dimensional earth model includes cross-line dip information.

5. The method of claim 3, wherein the three-dimensional earth model includes planar reflective information.

6. The method of claim 3, wherein the three-dimensional earth model includes diffractive surface information.

7. The method of claim 3, wherein generating the actual three-dimensional travel times comprises applying a ray tracing method to the three-dimensional earth model and one or more data acquisition geometry parameters.

8. The method of claim 7, wherein the data acquisition geometry includes the cable-feathering information.

9. The method of claim 1, wherein the multiple reflections are one of surface multiple reflections and interbed multiple reflections.

10. The method of claim 1, wherein applying the multiple prediction algorithm to the actual three-dimensional primary travel times comprises regularizing the actual three-dimensional primary travel times.

11. The method of claim 1, wherein applying the multiple prediction algorithm to the actual three-dimensional primary travel times comprises extrapolating the actual three-dimensional primary travel times to fill in one or more travel times associated with one or more missing data traces.

12. The method of claim 1, wherein applying the multiple prediction algorithm to the actual three-dimensional primary travel times comprises interpolating the actual three-dimensional primary travel times.

13. The method of claim 1, wherein applying the multiple prediction algorithm to the actual three-dimensional primary travel times comprises generating a set of reciprocal travel times for the actual three-dimensional primary travel times.

14. The method of claim 1, further comprising optimizing a marine survey design based on the timing errors.

15. The method of claim 14, wherein the marine survey design is optimized by:
   modifying one or more data acquisition geometry control parameters to minimize a cross line aperture.

16. The method of claim 15, wherein the data acquisition geometry control parameters comprise streamer cable feathering control parameters.

17. The method of claim 14, wherein the marine survey design is optimized by modifying a receiver cross line spread width to encompass the cross line aperture.

18. The method of claim 14, wherein the marine survey design is optimized during a line change.

19. The method of claim 1, further comprising adjusting one or more matching filters in an adaptive subtraction algorithm based on the timing errors, wherein the adaptive subtraction algorithm is configured to subtract one or more predicted multiple reflections from a plurality of seismic data traces.

20. The method of claim 19, wherein adjusting the multiple reflections comprises applying a static time shift to a plurality of seismic data traces.

21. The method of claim 1, further comprising adjusting one or more multiple reflections predicted by the multiple prediction algorithm based on the timing errors.

22. The method of claim 19, wherein adjusting the multiple reflections comprises:

splitting the multiple reflections produced by the multiple prediction algorithm into a plurality of segments; and adjusting the plurality of segments based on the timing errors.

23. The method of claim 1, further comprising:

adjusting the multiple reflections predicted by the multiple prediction algorithm based on the timing errors, thereby creating a plurality of possible multiple reflection models; and optimally filtering and subtracting the possible multiple reflection models from a plurality of seismic data traces based on a multidimensional adaptive subtraction algorithm.

24. The method of claim 1, further comprising:

repeating steps (b)-(d) for a second multiple prediction algorithm; and comparing the timing errors that occur in the multiple reflections predicted by the first multiple prediction algorithm with the timing errors that occur in the multiple reflections predicted by the second multiple prediction algorithm to determine which of the first multiple prediction algorithm or the second multiple prediction algorithm is more accurate.

25. The method of claim 1, wherein the multiple prediction algorithm comprises any preprocessing step that prepares recorded traces for multiple prediction.

26. An apparatus for computing one or more timing errors that occur in one or more multiple reflections predicted by a multiple prediction algorithm, comprising:

means for generating one or more actual three-dimensional primary travel times and one or more actual three-dimensional multiple travel times from an actual seismic survey having cable feathering information;

means for applying a first multiple prediction algorithm to the actual three-dimensional primary travel times to generate one or more travel times for the multiple reflections predicted by the first multiple prediction algorithm;

means for subtracting the actual three-dimensional multiple travel times from the travel times for the multiple reflections predicted by the first multiple prediction algorithm, thereby generating the timing errors that occur in the multiple reflections predicted by the first multiple predicted algorithm; and means for using the timing errors to evaluate the performance of the first multiple prediction algorithm.

27. The apparatus of claim 26, wherein the means for generating the actual three-dimensional primary travel times and the actual three-dimensional multiple travel times comprises means for applying a ray tracing method to a three-dimensional earth model and one or more data acquisition geometry having the cable-feathering information and source and receiver coordinates.

28. A method for computing one or more timing errors that occur in one or more multiple reflections predicted by a multiple prediction algorithm, comprising:

generating one or more actual three-dimensional primary travel times and one or more actual three-dimensional multiple travel times from an actual seismic survey having cable feathering information;

applying a first multiple surface related multiple reflections elimination (SRME) algorithm to the actual three-dimensional primary travel times to generate one or more travel times for the multiple reflections predicted by the first multiple prediction (SRME) algorithm;

subtracting the actual three-dimensional multiple travel times from the travel times for the multiple reflections predicted by the first multiple prediction SRME algorithm, thereby generating the timing errors that occur in the multiple reflections predicted by the first multiple prediction SRME algorithm;

determining whether the first multiple prediction algorithm is sufficient to remove the one or more multiple reflections from the seismic data based on one or more sizes of the timing errors; and wherein the application step, the subtraction step or the determining step is performed by program instructions accessed by a computer system.

29. The method of claim 28, wherein the multiple reflections are surface multiple reflections.

30. The method of claim 28, wherein the multiple SRME algorithm is a two dimensional (2D) SRME algorithm.

* * * * *